United States Patent [19]
Krawczyk et al.

[11] Patent Number: 5,824,743
[45] Date of Patent: Oct. 20, 1998

[54] ADHESIVE USABLE IN SOLVENT-FREE FORM

[75] Inventors: Gerhard Krawczyk, Bremen; Volker Dreja, Osterholz-Scharmbeck, both of Germany

[73] Assignee: Morton International, GmbH, Bremen, Germany

[21] Appl. No.: 645,670

[22] Filed: May 14, 1996

[30] Foreign Application Priority Data

May 20, 1995 [DE] Germany .................. 195 18 656.7

[51] Int. Cl.$^6$ .................................. C08G 18/62
[52] U.S. Cl. ............... 525/127; 525/123; 525/126; 525/131; 528/60; 528/66; 528/75; 528/77; 528/81; 528/83; 528/905
[58] Field of Search .................. 528/75, 60, 66, 528/46, 77, 81, 83, 905; 525/131, 127, 126, 123

[56] References Cited

U.S. PATENT DOCUMENTS

| | | | |
|---|---|---|---|
| 3,968,089 | 7/1976 | Cuscurida et al. | 528/50 |
| 4,524,104 | 6/1985 | Hageo et al. | 428/341 |
| 4,731,416 | 3/1988 | Saunders | 525/131 |

FOREIGN PATENT DOCUMENTS

| | | |
|---|---|---|
| 0246473 | 11/1987 | European Pat. Off. . |
| 0275908 | 7/1988 | European Pat. Off. . |
| 0279725 | 8/1988 | European Pat. Off. . |

*Primary Examiner*—Rachel Gorr
*Attorney, Agent, or Firm*—Wayne E. Nacker; Henry W. Tarring, II; Gerald K. White

[57] ABSTRACT

An adhesive for solvent-free use consists of at least one polyurethane containing —OH or —NCO end groups modified by a (meth)acrylate- or vinyl- homo- or copolymer which may contain hydroxy functions, in which the polyurethane is the product of the reaction between a polyether polyol or dialcohol and/or a polyester polyol with an isocyanate monomer containing 1 to 4 —NCO groups and/or a polyisocyanate and/or a polyurethane prepolymer containing NCO end groups or —OH end groups.

17 Claims, No Drawings

ADHESIVE USABLE IN SOLVENT-FREE FORM

Polyisocyanates with urethane groups, which are formed from low molecular weight polyalcohols and diisocyanates, have been known for a long time. Examples of such polyisocyanates are described in German patents DE-A-870 400 and DE-A-1 090 196. In producing such polymers by reacting polyalcohols with diisocyanates, an excess of diisocyanate produces polyisocyanate polymers with free isocyanate groups while an excess of polyalcohols produces polyurethanes with free OH groups. Such products are important raw materials for lacquers and adhesives. They have problems, however, of not being very stable to light, and the raw materials are expensive.

The polymerisation of styrene and acrylonitrile in the presence of detergents in polyethers to form filled polyethers or polyol polymers is also known. They are used as raw materials for the production of polymeric dispersions in polyurethanes and foams. Reference should be made in this respect to British patent GB-A-1 455 495, Belgian patent BE-A-0 635 489 and Spanish patents ES-0 555 780 and ES-A-0 555 890. The use of epoxy dispersions in polyols is disclosed in German patent DE-A-2 943 689. Transparent adhesive systems are not described therein.

Finally, polyurethane acrylates, formed by the addition of acrylates containing hydroxy functions to polyurethanes with NCO end groups in the presence of monomeric acrylates, are generally known and used as reactive thinners in radiation or UV hardening systems. Adhesives which can be used without solvents are not described in any of those groups of polymers. Further, the viscosities of polyacrylates are too high to be able to combine them with polyurethane polymers without using a solvent. However, in many technical fields, the use of adhesives which contain solvents is undesirable, since the solvent is released from the adhesive on drying, which can lead to damage to health or to high costs. Still further, many industries need transparent adhesives, in particular when transparent materials are to be laminated together.

The object of the present invention is thus to provide novel solvent-free transparent adhesives.

In accordance with the invention, an adhesive is provided which consists of at least one polyurethane (b) containing —OH or —NCO end groups modified by a (meth)acrylate- or vinyl- homo- or copolymer (a) which may contain hydroxy functions, in which the polyurethane (b) is the product of the reaction between a polyether polyol (c) or a dialcohol ($c_1$) and/or a polyester polyol ($c_2$) with an isocyanate monomer (d) containing 1 to 4 —NCO groups ($d_1$) and/or a polyisocyanate ($d_2$) and/or a low viscosity polyurethane prepolymer ($d_3$) containing NCO end groups or —OH end groups.

When it is stated here that the adhesive of the invention can be used without a solvent, this does not mean that it must be used without a solvent. The scope of the invention also includes the use of such adhesives with a solvent, although it is preferable to use the adhesives of the invention without a solvent. The adhesives of the invention can also be used in a single or two-component form.

Surprisingly, the adhesives of the invention have a sufficiently low viscosity to enable them to be used without thinning, i.e., without the addition of a solvent. Surprisingly too, they are transparent, so they can be used to adhere together transparent materials, such as clear plastic sheets. The adhesives of the invention can be used in many technical fields. Advantageously, they can be used to laminate paper with plastic sheets, to laminate a plastic film onto wood or chipboard articles, to bind paper or cardboard with aluminium foil, to laminate different types of plastic foil together and to laminate aluminium foil with plastic foil.

The polyurethanes (b) used as starting materials are thus reaction products of a polyetherpolyol and/or a polyesterpolyol (c) with a component (d) which contains —NCO end groups. In accordance with the invention, polyurethane (b) is modified by at least one component (a). This modification cannot be achieved by simple solvent-free mixing of components (a) and (b). Component (a) can, however, be mixed as a monomer with component (b) and polymerised with it to produce a mixture of polyacrylate and polyurethane. The (meth)acrylate- or vinyl- homo- or copolymer can also contain free hydroxy groups. Such polymers containing hydroxy groups (a) are then covalently bonded by polyaddition to monomeric isocyanates ($d_1$) or polyurethane prepolymers containing —NCO end groups ($d_3$) or mixtures thereof.

Component (a), with which polyurethane (b) is modified, is a homopolymer or copolymer of an acrylic acid, methacrylic acid or a derivative thereof and/or vinyl compound. This polymer is advantageously derived from a (meth) acrylic acid or an ester thereof with the following general formula:

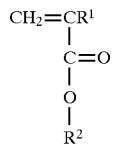

where $R^1$ is H or $CH_3$ and $R^2$ is H or a $C_{1-8}$ alkyl group. Vinyl polymer (a) is preferably derived from vinyl acetate or derivatives thereof with the following general formula:

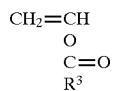

where $R^3$ is $CH_3$ or $C_2H_5$. The comonomer of copolymer (a) is, for example, a compound containing hydroxy groups with the following general formula:

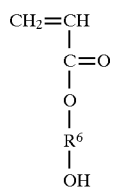

where $R^6$ is —$C_2H_4$ or —$C_3H_6$. A vinyl monomer containing primary or secondary amine groups can also be used.

Reaction component (c) of polyurethane (b) can be at least one polyetherpolyol or at least one polyesterpolyol or a mixture of at least one polyetherpolyol and at least one polyesterpolyol. Instead of a polyetherpolyol, a dialcohol or glycol can be used.

Polyetherpolyol component ($c_1$) has one of the following formulae:

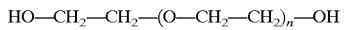

or

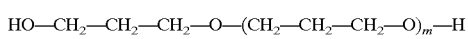

where m and n are each a whole number from 1 to 500, preferably 4 to 30. Mixtures of these polyetherpolyols can be used, of course, mixed with each other or with at least one dialcohol with the above two formulae in which n or m equals 0. Components ($c_1$) can also consist of only one dialcohol with one of the above formulae, where n or m equals 0, or of a mixture of such dialcohols. Advantageously, when manufacturing the inventive adhesive, a polyetherpolyol is used with a molecular weight in the range 62 to 6000, preferably in the range 400 to 3000, the molecular weight being calculated on the basis of hydroxy group content and hydroxy group functionality.

When a polyesterpolyol or a mixture of polyesterpolyols is used as component (c), the polyesterpolyol has the general formula:

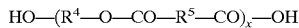

HO—($R^4$—O—CO—$R^5$—CO)$_x$—OH where $R^4$ and $R^5$ are aliphatic and/or aromatic and/or cycloaliphatic double-ended residues and x is a whole number, with a molecular weight for the polyesterpolyol of at least 400. The molecular weights of the polyesterpolyols are advantageously in the range 400 to 6000, preferably in the range 1000 to 3000, where the molecular weights are again calculated on the basis of hydroxy group content and hydroxy group functionality. Particular examples of the double-ended residues $R^4$ and $R^5$ in this formula are:

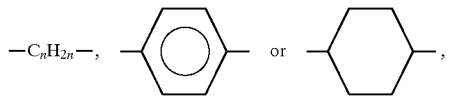

—$C_nH_{2n}$—,           or where n is in the range 4 to 20.

Reaction component (d) can be a monomeric isocyanate with 1 to 4 —NCO groups ($d_1$) and advantageously, it has the following formula:

R(NCO)$_y$ where R is a $C_{4-12}$ aliphatic, a $C_{6-15}$ aromatic or a $C_{6-15}$ cycloaliphatic hydrocarbon group and y is 1 to 4. Preferably, the monomeric isocyanate is a diisocyanate, with formula

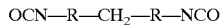

OCN—R—CH$_2$—R—NCO where R is as defined above. Examples of such diisocyanates are 4,4'- or 2,4-diphenylmethane diisocyanate (MDI), 2,4- or 2,6-toluylene diisocyanate (TDI) or isophorone diisocyanate (IPDI).

When component (d) is a polyurethane prepolymer ($d_3$), the NCO content is advantageously 2% to 15%, preferably 2% to 8% by weight, and its viscosity at 25° C. is 1000 to 15000, preferably 1500 to 8000 mPa.s.

When polyurethane (b) is to have NCO end groups, starting components (c) and (d) are advantageously selected and mixed in such proportions that the NCO content of polyurethane (b) is 0.5% to 15%, preferably 2% to 8%. When polyurethane (b) is to have OH end groups, the number of OH groups is 1 to 110, preferably 10 to 50.

The prepared modified polyurethane adhesive of the invention has a fused viscosity at 100° C. of less than 10000, preferably less than 2500 mPa.s. The acrylate or vinyl content can be more than 50% by weight. Advantageously, the weight ratio of (a) to (b) is in the range 1:99 to 80:20, preferably in the range 30:70 to 60:40.

Modification of polyurethane (b) by component (a) can be effected in a number of different ways. As an example, acrylate, methacrylate or vinylmonomers (a) can be polymerised in polyetherpolyol ($c_1$) and/or polyesterpolyol ($c_2$), to which either isocyanate monomers, in particular diisocyanates, can be added to form polyurethanes in the presence of polyacrylates, polymethacrylates or vinylpolymers, or to which polyurethane prepolymers with NCO end groups are added. Alternatively, starting from polyurethane prepolymers with OH or NCO end groups, acrylate, methacrylate or vinyl compounds are added, which are then polymerised. Finally, simultaneous polymerisation of acrylate, methacrylate or vinyl monomers and polyaddition of polyether and/or polyesterpolyols with monomeric isocyanates to form polyurethanes with OH or NCO end groups is possible.

The adhesive of the invention may, for example, be manufactured as follows: in a first reaction step, a vinyl acetate and/or acrylate monomer is fully polymerised to the corresponding polymer in a polyether and/or polyesterpolyol at 80° C. to 130° C. using a free radical route. The fraction of polymer in the polyol component can be more than 65% by weight. The viscosity at 25° C. is normally less then 10000 mPa.s, preferably less than 5000 mPa.s. In accordance with the above implementations, addition of low viscosity polyurethane prepolymers with NCO end groups causes polyaddition with polyurethane formation. Thus a combination of polyacrylate and polyurethane is formed as a solvent-free product.

The fused viscosity of the inventive adhesive is, surprisingly, low enough for the adhesive to be used without a solvent at ambient temperature or at higher temperature, although of course it could be used in a solvent-containing system when desired. The inventive adhesives can be used without a solvent, i.e., 100%, at working temperatures of 20° C. to 100° C. When used with a solvent, the solid content is advantageously in the range 20% to 85% by weight at ambient temperature. Examples of suitable solvents for the adhesive of the invention are ethyl acetate, isopropyl acetate, butyl acetate, and other organic solvents normally used for lacquers and adhesives. Surprisingly, the adhesives of the invention are far easier to thin than analogous acrylate-free polyurethanes, and solutions with a viscosity of, for example, 20 sec (see DIN 53 211, 20° C.) can have a solid content of up to 70% by weight, which makes this adhesive easy to use and dries easily with normal machine speeds and/or large quantities. The adhesives are transparent and can thus be used to laminate transparent sheets or for paper finishing. They produce high starting adhesion and are very stable to light with low raw material costs compared with corresponding unmodified polyurethanes.

The following example further illustrates the invention. The percentages given below are all percentages by weight.

EXAMPLE 1

Production of acrylate modified polyisocyanates on a polyether and polyester base.

260 g of a polyetherpolyol with an average molecular weight of 400 was heated to 100° C. A mixture of 190 g of vinyl acetate, 104 g of butyl acrylate and 3 g of 2,2'-azoisobis-(butyronitrile) (AIBN) was added over 2 hours. Polymerisation was carried out for 1 hour at a temperature of 110° C. 0.5 g of AIBN was added, and stirring was carried out for a further hour at 120° C.

After 1 hour a further 0.5 g of AIBN was added, and again polymerisation was carried out for 1 hour at 120° C. After completion of these steps, it was cooled to 70° C. and 432 g of a polyurethane prepolymer with 110 g of a polyesterpolyol with an average molecular weight of 2800 and 322 g of 4,4'-diphenylmethane diisocyanate (MDI) were added.

This was stirred under an inert atmosphere at 90° C. for 2 hours. A clear transparent adhesive with NCO end groups and the following properties was obtained:

Solid content: 100%

Viscosity (100° C.): about 2500 mPa.s

NCO content: 5%

Fraction of copolymer: 30%

COMPARATIVE EXAMPLE

Production of an acrylate-free polyisocyanate on a polyester and polyether base

The procedure of Example 1 was repeated, with the exception that no acrylate monomers were added. The use of 324 g of MDI ensured that the NCO content was analogous to that of Example 1. The clear adhesive obtained had the following properties:

Solid content: 100%

Viscosity (100° C.): about 8000 mPa.s

NCO content: 5%

Fraction of copolymer: 0%

The substantially higher viscosity meant that this adhesive could not be used without a solvent.

EXAMPLE 2

Production of an acrylate modified polyurethane with OH end groups on a polyether base 400 g of a polyetherpolyol with an average molecular weight of 400 was heated to 110° C. A mixture of 450 g of butylacrylate, 100 g of methylmethacrylate and 5 g of AIBN was added over a period of 2 hours at 110° C. It was stirred for 1 hour at 110° C. 0.5 g of AIBN was added, and polymerisation was continued for 2 hours at 120° C. It was then cooled to 70° C., and 15 g of triisopropanolamine (TIPA) and 122 g of isophorone diisocyanate (IPDI) were added with stirring. The temperature was kept at 90° C. for 2 hours. The clear transparent adhesive obtained had the following properties:

Solid content: 100%

Viscosity (100° C.): about 1800 mPa.s

OH content: 1.8%

Fraction of copolymer: 55%

EXAMPLE 3

Acrylate modified polyisocyanate with solvent base 420 g of the adhesive of Example 1 was thinned with 580 g of (anhydrous) isopropyl acetate. The clear adhesive had the following properties:

Solid content: 42%

Viscosity (20° C.): about 18 sec (DIN 53 211)

Acrylate content: 12.6%

Fraction of copolymer: 2.1%

We claim:

1. Transparent solvent-free adhesive having a melt viscosity at 100° C. less than 2500 mPa.s and comprising at least one (b) polyurethane containing OH— or NCO-terminals modified by (a) at least one (meth)acrylate- or vinyl-homo- or copolymer which may contain hydroxy functions and which has been obtained by free radical polymerization, wherein the polyurethane (b) is a reaction product of ($c_1$) a polyetherdiol and/or ($c_2$) a polyesterdiol with ($d_1$) a monomeric isocyanate having 1 to 2 NCO-groups and/or ($d_2$) a polyisocyanate, the weight ratio of (a) to (b) being 30:70 to 60:40.

2. Adhesive according to claim 1 wherein a hydroxy functional (meth)acryl- or vinyl-homo- or copolymer (a) is bonded to a monomeric isocyanate ($d_1$) and/or a polyurethane prepolymer by polyaddition.

3. Adhesive according to claim 1 wherein the (meth) acrylate-homo- or copolymer is derived from (meth)acrylic acid or an ester thereof having the general formula

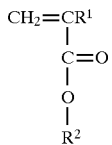

wherein $R^1$ is H or $CH_3$ and $R^2$ is H or a $C_{1-8}$-alkyl-group.

4. Adhesive according to claim 1 wherein the vinylhomo- or copolymer is derived from vinylacetate or a derivative thereof having the general formula

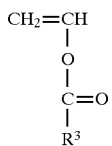

wherein $R^3$ is $CH_3$ or $C_2H_5$.

5. Adhesive according to claim 1 wherein the polyetherdiol ($c_1$) has the general formula

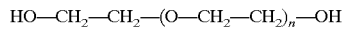

or the general formula

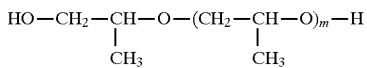

wherein m and n each are an integer from 2 to 500.

6. Adhesive according to claim 5 wherein m and n are each an integer from 4 to 30.

7. Adhesive according to claim 1 wherein the polyesterdiol ($c_2$) has the general formula

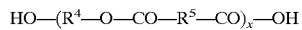

wherein $R^4$ and $R^5$ are aliphatic and/or aromatic and/or cycloaliphatic divalent radicals and x is an integer resulting in a molecular weight of the polyesterdiol of at least 400.

8. Adhesive according to claim 1 wherein the polyetherdiol ($c_1$) has a molecular weight of up to 6000.

9. Adhesive according to claim 1 wherein the polyetherdiol ($c_1$) has a molecular weight of 400 to 3000.

10. Adhesive according to claim 1 wherein the polyesterdiol ($c_2$) has a molecular weight of 400 to 6000.

11. Adhesive according to claim 1 wherein the polyesterdiol ($c_2$) has a molecular weight of 1000 to 3000.

12. Adhesive according to claim 1 wherein the monomeric isocyanate ($d_1$) has the general formula

where R is a $C_{4-12}$ aliphatic, a $C_{6-15}$ aromatic or a $C_{6-15}$ cycloaliphatic hydrocarbon group and y is 1 to 2.

13. Adhesive according to claim 12 wherein the monomeric isocyanate ($d_1$) has the general formula

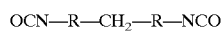

wherein R is a $C_{4-12}$-aliphatic, $C_{6-15}$-aromatic or $C_{8-15}$-cycloaliphatic hydrocarbon group.

14. Adhesive according to claim 1 wherein the polyurethane (b) has a NCO— content of 0.5 to 15 weight %.

15. Adhesive according to claim 1 wherein the polyurethane (b) has a NCO— content of 2 to 8 weight %.

16. Adhesive according to claim 1 wherein the polyurethane (b) has an OH number from 1 to 110.

17. Adhesive according to claim 1 wherein the polyurethane (b) has an OH number from 10 to 50.

* * * * *